United States Patent [19]

Genise

[11] Patent Number: 5,221,401
[45] Date of Patent: Jun. 22, 1993

[54] METHOD FOR BONDING FRICTION MATERIAL ONTO A FRUSTOCONICAL SURFACE

[75] Inventor: Thomas A. Genise, Dearborn, Mich.

[73] Assignee: Eaton Corporation, Cleveland, Ohio

[21] Appl. No.: 797,731

[22] Filed: Nov. 25, 1991

Related U.S. Application Data

[60] Division of Ser. No. 651,114, Feb. 5, 1991, Pat. No. 5,091,041, which is a continuation of Ser. No. 327,483, Mar. 22, 1989, abandoned.

[51] Int. Cl.$^5$ .................... B32B 18/00; F16D 13/60; F16D 69/04
[52] U.S. Cl. ................................ 156/293; 156/155; 156/245; 192/107 M; 192/53 F; 188/251 A
[58] Field of Search ............... 156/155, 293, 294, 245; 192/107 M, 53 F; 188/251 A

[56] References Cited

U.S. PATENT DOCUMENTS

| | | |
|---|---|---|
| 2,014,815 | 9/1935 | Rutledge . |
| 2,196,569 | 4/1940 | Stroehla et al. ............... 192/107 M |
| 2,797,180 | 6/1957 | Baldanza . |
| 3,304,078 | 2/1967 | Hoge . |
| 3,936,552 | 2/1976 | Krupp et al. ............... 192/107 M X |
| 3,983,979 | 10/1976 | Richards . |
| 4,141,440 | 2/1979 | Richards . |
| 4,176,736 | 12/1979 | Richards et al. . |
| 4,183,892 | 1/1980 | Corsi et al. . |
| 4,291,794 | 9/1981 | Bauer . |
| 4,700,823 | 10/1987 | Winckler . |
| 4,703,667 | 11/1987 | Richards . |
| 4,778,548 | 10/1988 | Fox et al. .......................... 156/153 |
| 4,931,117 | 6/1990 | Muller et al. . |

Primary Examiner—Jeff H. Aftergut
Attorney, Agent, or Firm—P. S. Rulon

[57] ABSTRACT

A blocker-clutch assembly (10) includes an openly porous, pyrolytic carbon composite friction material (74) configured for optimum performance and, therefore, prevention or substantial prevention of nonsynchronous engagement of positive clutch members (12,14) due to premature unblocking of blocker tooth ramps (48-54). The composite friction material is formed to be resilient in direction normal to its friction surface (76c), is cut into segments (76), is positioned and bonded to a frustoconical surface (62) using fixtures 80,82 for preserving the resiliency and with the segments circumferentially spaced apart, and is configured to control engagement force thereon in a range of 150-300 pounds per square inch (100-200 N/cm$^2$).

3 Claims, 7 Drawing Sheets

METHOD FOR BONDING FRICTION MATERIAL ONTO A FRUSTOCONICAL SURFACE

This is a divisional of copending application(s) Ser. No. 07/651,114, now U.S. Pat. No. 5,091,041, filed on Feb. 5, 1991 and which is a continuation of abandoned application Ser. No. 07/327,483, filed Mar. 22, 1989.

CROSS-REFERENCE TO RELATED APPLICATION

This application is related to U.S. Application Ser. Nos. 174,277 and 174,475, filed Mar. 28, 1988. Both of these applications are assigned to the assignee of this application.

1. Field of the Invention

This invention relates to liquid cooled, frictionally engaged, energy absorbing devices such as clutches and brakes. More specifically, the invention relates to bonding friction material to conical surfaces used in such devices.

2. Background of the Invention

Openly porous carbon/carbon composite friction material formed of carbon fibrous substrate coated with pyrolytic carbon by chemical vapor deposition (CVD) is known in the prior art as may be seen by reference to U.S. Pat. Nos. 4,291,794 and 4,700,823. The disclosures of these documents are incorporated herein by reference.

Blocked, change gear transmissions of the single and compound type are also known in the prior art as may be seen in U.S. Pat. Nos. 3,983,979; 4,141,440; 4,176,736; and 4,703,667. The disclosures of these documents are also incorporated herein by reference.

Blocker-clutch assemblies used in these change gear transmissions include first and second positive or jaw clutches which are axially moved between engaged and disengaged positions to effect gear changes. Each assembly includes a frictionally engagable blocker ring which prevents asynchronous engagement of the jaw clutches in response to initial engaging movement thereof. The blocker ring is supported by the first jaw clutch for limited rotation relative thereto and includes a friction surface which engages a second friction surface, secured for rotation with the second jaw clutch, in response to the initial engaging movement of the jaw clutches. If the jaw clutches are rotating at different speeds during the initial engaging movement thereof, the frictional engagement effects limited rotation of the blocker ring to a position blocking engagement of the jaw clutches until substantial synchronization of the jaw clutches is achieved.

The above described blocker-clutch assemblies have greatly reduced the complexity and effort required to effect gear changes. However, for various surmised reasons the blocker rings have been known to prematurely move to the unblocking position before the jaw clutches reach synchronism or substantially synchronous speeds, thereby allowing asynchronous engagement of the jaw clutch teeth with resultant excessive wear thereto and in some cases failure of the jaw clutches. Providing at least on the friction surfaces with the above composite friction material has effectively solved premature unblocking, provided the material is properly bonded to the surface.

SUMMARY OF THE INVENTION

An object of the invention is to provide fixture and method for bonding a friction material to optimize performance thereof.

Another object of the invention is to eliminate or substantially eliminate asynchronous engagement of jaw clutches in synchronizer or blocker assemblies by proper bonding of a friction material to optimize performance thereof.

According to a feature of the invention, a fixture is provided for bonding a plurality of porous friction material segments in circumferentially spaced apart positions to a frustoconical surface defined by a support member. The segments are formed of a carbon fibrous material woven into a single layer of fabric substrate coated with carbon deposited thereon by chemical vapor deposition to a density of 0.3 to 1.3 gm/cc. One side of the segments have a bonding material affixed thereto. The fixture is characterized by a base member having a horizontal surface; at least one ring member supported on the horizontal surface with the axis of the ring member vertically oriented and normal to the horizontal surface, the support member including a frustoconical surface complimentary to the support member frustoconical surface and ledge means extending radially from the support member surface a distance less than the thickness of the segments, the support member frustoconical surface positioned concentric and adjacent the ring member frustoconical surface with the friction material segments sandwiched therebetween, with the adhesive against the support member surface, and with an edge of each segment positioned against the ledge means, thereby forming an annular assembly; and means for clamping the assembly to the base with a predetermined resilient force acting on the segments, whereby the fixture may be positioned in a source of heat for curing the adhesive under substantially constant clamping force.

According to a method of the invention, the frustoconical surfaces of the members are positioned in spaced relation a distance greater than the thickness of the segments and with distance between the ledge means and the support member surface less than the thickness of the segments; the segments are inserted in circumferentially spaced relation between the surfaces with the adhesive facing the support member surface and with an edge of each segment against the ledge means; moving the members axially relative to each other in a direction decreasing the spaced distance between the surfaces for sandwiching the segments between the surfaces; applying a resilient clamping force to the members in a direction tending to further decrease the spaced distance; and heating the members to cure the adhesive while maintaining the clamping force.

BRIEF DESCRIPTION OF THE DRAWINGS

A preferred embodiment of the invention is shown in the accompanying drawings in which.

DETAILED DESCRIPTION OF THE DRAWINGS

Prior to proceeding with the detailed description, definitions of a few technical terms are provided to facilitate a clearer understanding of the invention.

1. Pyrolytic carbon composite material—a carbon fibrous substrate coated or densified with pyrolytic carbon by a chemical vapor deposition (CVD) process.

2. Substrate—an assemblage of carbon fibers or filaments.

3. Filament—a fiber whose aspect ratio (length to effective diameter) is for all practical purposes infinity, i.e., a continuous fiber.

4. Fiber—relatively short lengths of very small cross-sections which may be chopped filaments.

5. Strand—a bundle of continuous filaments combined in a single compact unit without twist.

6. Yarn—an assemblage of twisted fibers or strands to form a continuous yarn or spun yarn suitable for use in weaving.

7. Bonding material—elements or substances capable of holding two materials together primarily by surface attachment, e.g., adhesives or brazings.

8. Adhesion—the state in which two surfaces are held together at an interface by forces or interlocking action or both.

9. Mechanical Adhesion—adhesion between surfaces in which the adhesive holds the parts together by interlocking action.

10. Carbon—herein the term carbon includes graphite unless the term graphite is explicitly used.

11. Total Porosity—includes open and closed pores or voids in the composite material. Open pores are open to the surface of the composite and may extend completely through the composite.

12. Synchronizer—a device having blocker means for preventing asynchronous engagement of jaw or spline teeth of positive clutch members, and friction means operative to effect engagement of the blocker means and to generate sufficient torque during most operating conditions to drive the positive clutch members toward synchronism.

13. Blocker—a device similar to a synchronizer but not operative during most operating conditions to generate sufficient torque to effectively drive the positive clutch members toward synchronism. Blockers of the general type disclosed herein are known in the art as may be seen by reference to previously mentioned U.S. Pat. Nos. 3,983,979; 4,141,440; 4,176,736; and 4,703,667.

Figure 1:
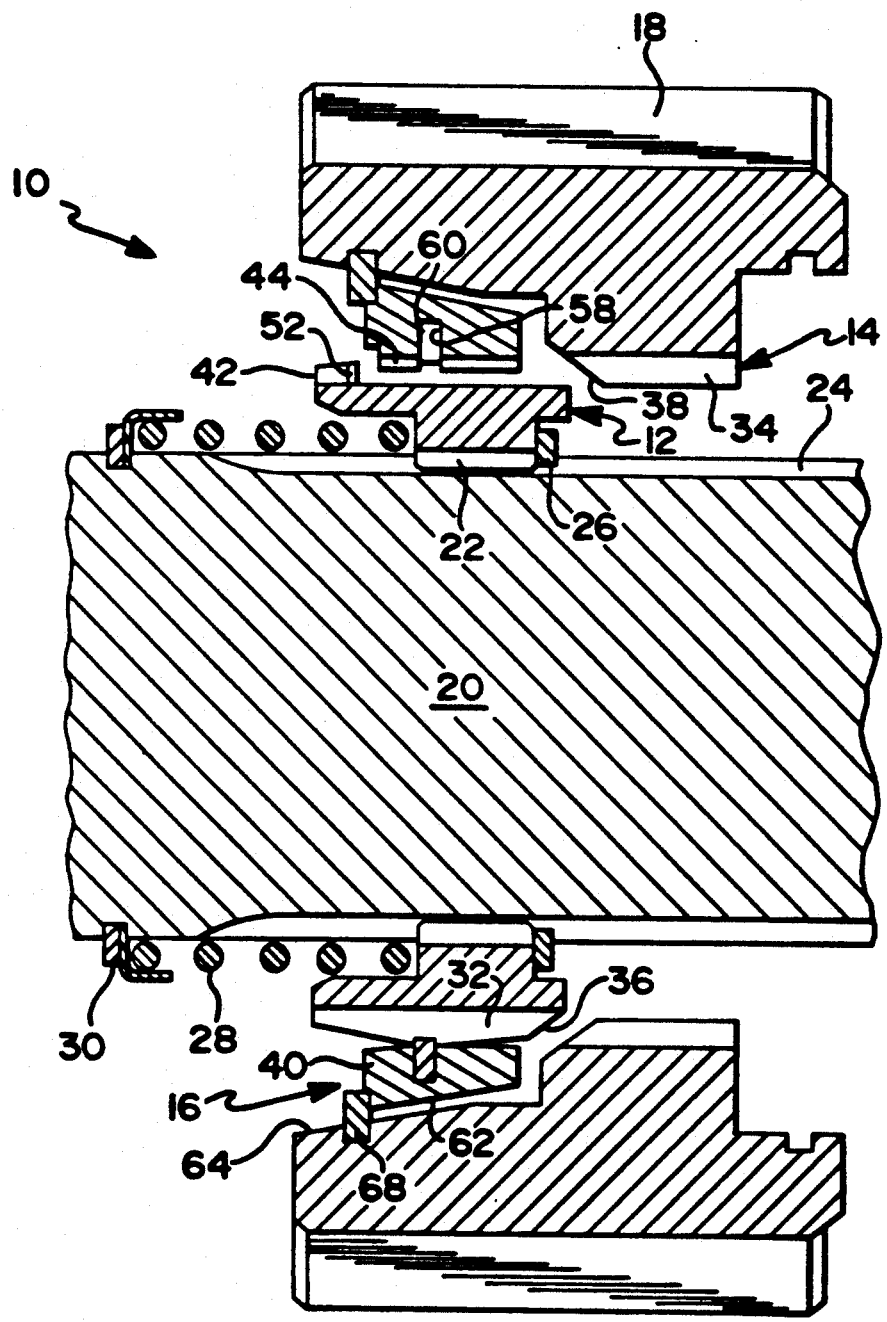
FIG. 1 is a sectional view of a blocker-clutch assembly comprising an environment for use of the invention.
Figure 2:
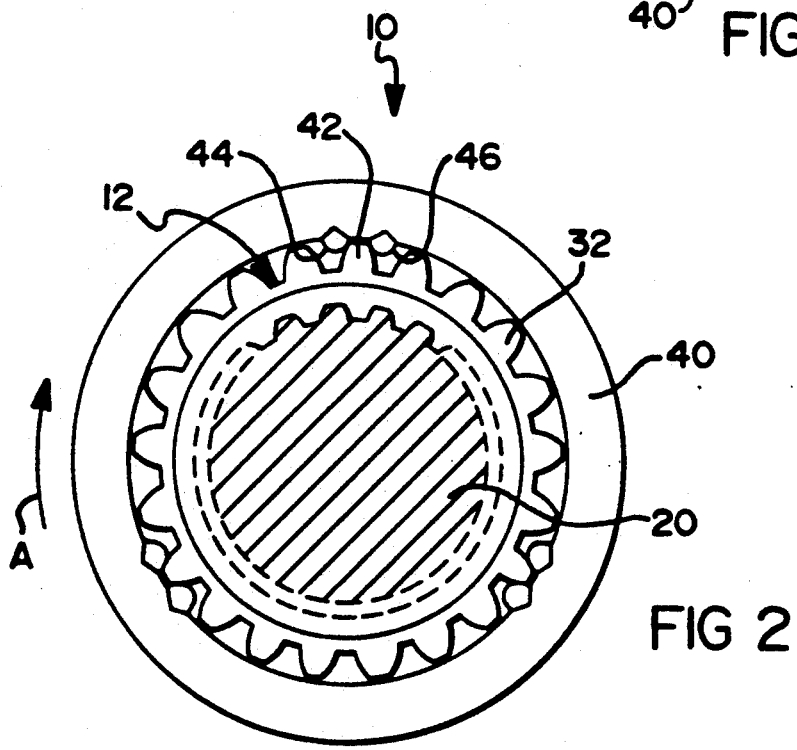

Referring now to FIGS. 1, 2, therein is illustrated a blocker-clutch assembly 10 having first and second positive clutch members 12,14 and a blocker mechanism 16 for preventing asynchronous engagement of the clutch members which are respectively connected to a shaft 20 and a gear 18. Gear 18 and shaft 20 may form part of a 4×3 compound transmission such as the twelve forward speed, semi-blocked splitter type compound transmission disclosed in U.S. Pat. No. 4,703,667. Therein shaft 20 would be a transmission main shaft disposed at an extension of its left end into a main transmission section having four change speed ratios. Gear 18 would a constant mesh splitter gear disposed in an auxiliary transmission section.

Clutch member 12 is provided with internal splines 22 which are disposed with corresponding external splines 24 provided on shaft 20 for interconnecting clutch member 12 to the shaft for rotation therewith. The cooperating splines permit clutch member to freely slide axially relative to shaft 20. A stop ring 26 is seated within a suitable groove formed in the external periphery of the shaft and disposed for contacting clutch member 12 and limiting rightward axial movement thereof. Clutch member 12 is resiliently urged rightward by a spring 28 which reacts at its left end against a spring seat 30 secured to shaft 20 in a manner similar to stop ring 26.

Clutch member 12 is provided with external spline teeth 32 thereon which are adapted to meshingly engage internal spline teeth 34 of clutch member 14 and provided on gear 18. Teeth 32 of clutch member 12 are tapered, as at 36, in a manner similar to the leading edge 38 of teeth 34 on gear 18. The tapered conical surface defined by the tapered leading edges extends at an angle of between 30° and 40° relative to the longitudinal axis of the shaft. The exact degree of taper and the advantages thereof are explained in detail in U.S. Pat. No. 3,265,173.

A selected number, herein three, of external spline teeth 32 are partially removed for permitting the presence of a blocker ring 40 of the blocker mechanism which is further described hereinafter. Such partial removal leaves three axially shortened blocker tooth portions 42 for cooperating with blocker ring 40. Preferably, the tooth portions are disposed in a common plane and circumferentially spaced equal distances apart; however, asymmetrical arrangements such as disclosed in U.S. Pat. No. 4,703,667 may be used in some applications. The blocker ring comprises a nondeformable ring encircling clutch member 12. The ring, as may be seen by also referring to FIGS. 3-5, includes an appropriate member, herein three pairs, of radially inwardly extending projections 44,46 which, when properly positioned, mate with external spline teeth 32. Each pair of projections 44,46 have a total circumferential dimension less than the corresponding circumferential spaces defined by partially removing the tooth portions, thereby allowing limited clockwise and counterclockwise rotation of the blocker ring relative to clutch member 12 from a position seen in FIG. 3 wherein the spaces between tooth projections 44,46 align with tooth portions 42. Contact of the sides or flanks of either tooth projection 44,46 with the sides or flanks of spline teeth 32 on either side of the space provided by the partial tooth removal will limit such relative rotation and cause blocker ring 40 to rotate with clutch member 12. The space between each inwardly projecting tooth pair 44,46 has a clearance distance wider than the corresponding circumferential dimension of tooth portions 42 so that when properly aligned at synchronism (or more accurately when the relative speeds of blocker ring 40 and clutch member 12 cross synchronism) the tooth projections 44,46 will straddle tooth portions 42 and clutch member 12 can move axially through but not past blocker ring to effect engagement with spline teeth 34 of gear 18.

Figure 3:
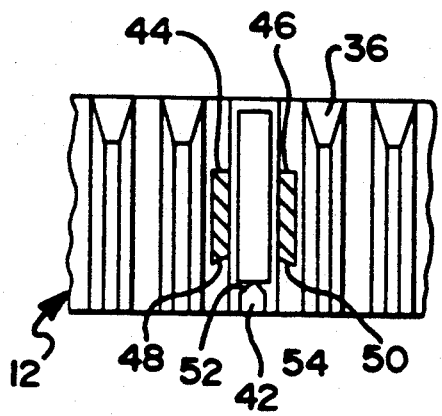
FIG. 2-5 illustrate features of the assembly in FIG. 1.
Figure 4:
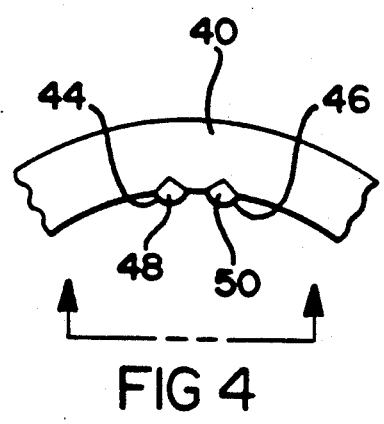
Figure 5:
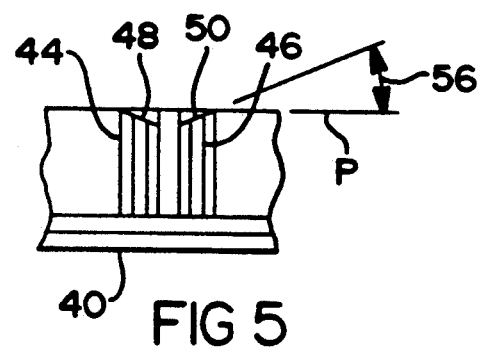

As may be seen in FIGS. 3-5, the end faces of tooth projections 44,46, which function as blocker teeth, are tapered or ramped as at 48,50. The end face of each tooth portion 42 is also preferably provided with tapers or ramps 52,54 corresponding with tapers or ramps 48,50. The angles 56 of the ramps 48-54 are selected such that blocking teeth 44,46 and tooth portions 42 remain in proper blocked position when unshown but previously mounted main transmission section at the left end of shaft 20 is not in neutral, but will tend under a contacting force, such as the force provided by spring 28, to cause the blocker and clutch member to assume a nonblocking position when the main transmission is in neutral and the gear 18 has been selected for engagement. Such ramps are known in the art as sensor unblocking ramps. Ramp angles 56 of about 15°-25°, preferably 20°, relative to a plane P normal to the axis of rotation of shaft 20 have proven highly satisfactory for most known semi-blocked transmissions.

As described in greater detail by reference to U.S. Pat. Nos. 3,921,469 and 3,924,484, the radially inner side of blocker ring 40 may be provided with a groove 58 which receives a split, annular, resilient ring 60. Ring 60 is normally of slightly less internal diameter than the external diameter of clutch member teeth 34 so that when the parts are in the assembled condition, ring 60 is distorted slightly outwardly to thereby exert a light but definite resilient clamping pressure against the external surfaces of teeth 34. Inasmuch as ring 60 fits loosely within the walls of groove 58, the resilient clamping pressure effects a significant resistance to axial movement between the blocker ring and clutch member but only an insignificant resistance to relative rotational movement therebetween.

Blocker ring 40 includes a generally outward facing frustum of a cone shape or frustoconical surface 62 positioned to frictionally engage a generally inwardly facing frustum of a cone or frustoconical surface 64 on a radially inner wall of gear 18 in response to initial axial engaging movement of gear 18 leftward by a shift fork 66 schematically illustrated in FIG. 6. The axial drag provided by resilient ring 60 resists axial movement of blocker ring 40 relative to clutch member 12 which is biased rightward by spring 28. Accordingly, ring 60 functions as a pre-energizer ring whose axial drag effects initial engagement of the surfaces 62,64 prior to axial movement of the blocker ring 40. A stop ring 68 limits movement of blocker ring 40 away from frustoconical surface 64 when gear 18 is moved rightward to effect disengagement of positive clutch members 12,14.

With respect to FIGS. 2-5 and assuming shaft 20, clutch member 12, and gear 18 are normally driven in a clockwise direction (arrow A in FIG. 2), it is apparent that a nonsynchronous condition comprising gear 18 rotating faster than shaft 20 and clutch member 12 will cause blocking ring 40 to tend to rotate clockwise a limited amount relative to clutch member 12 as soon as frustoconical surface 62,64 engage. Initial engagement of surfaces 62,64 is, of course, in response to initial engaging movement of gear 18 by shift fork 66 and the axial drag provided by per-energizer ring 60. Shift fork 66 is connected to a piston 70 in an actuator 72 which receives pressurized air for moving the piston to and fro in known manner. The torque applied to blocker ring 40 by the initial frictional engagement due to the drag of pre-energized ring, through relatively, small is sufficient to axially align ramps 48 of the blocker tooth projections 44 with ramps 52 of tooth portions 42 prior to axial engagement of the ramps. Once the ramps engage, the force of spring 28 is transmitted through the interface of the ramps to increase the engaging force of the friction surfaces and thereby proportionally increase the blocking torque which is counter to the unblocking torque provided by ramps 48,52. In theory, this increased blocking torque is sufficient to maintain blocking engagement of the ramps until clutch members 12,14 cross synchronism.

Figure 6C:
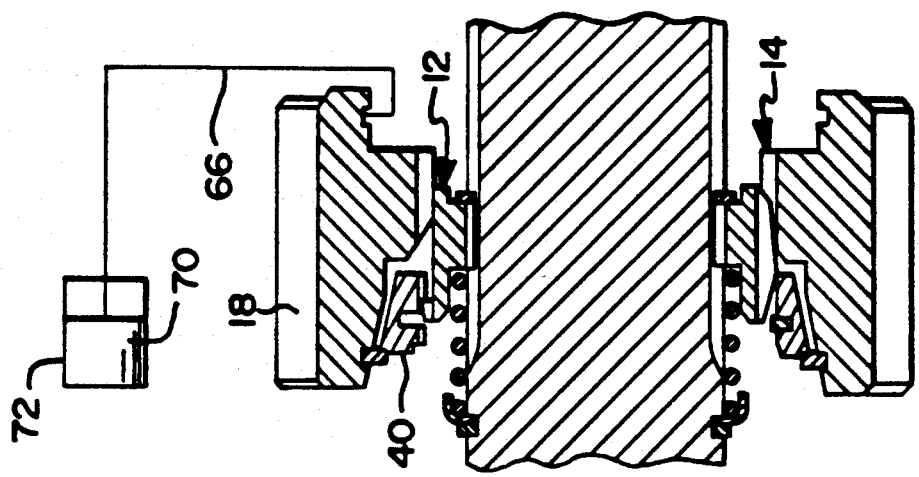
FIGS. 6A-6C respectively illustrate the blocker-clutch assembly in a neutral or nonselected position, in a preselected position, and in an engaged position.
Figure 6B:
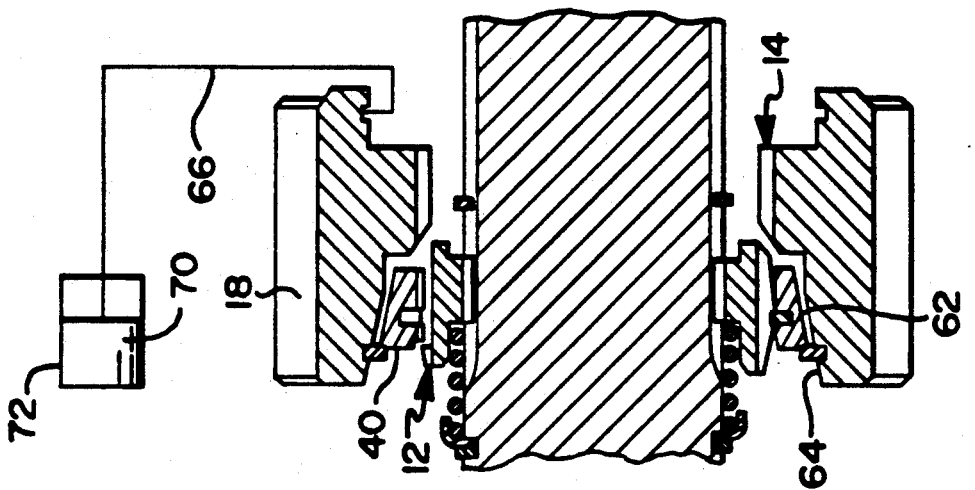
Figure 6A:
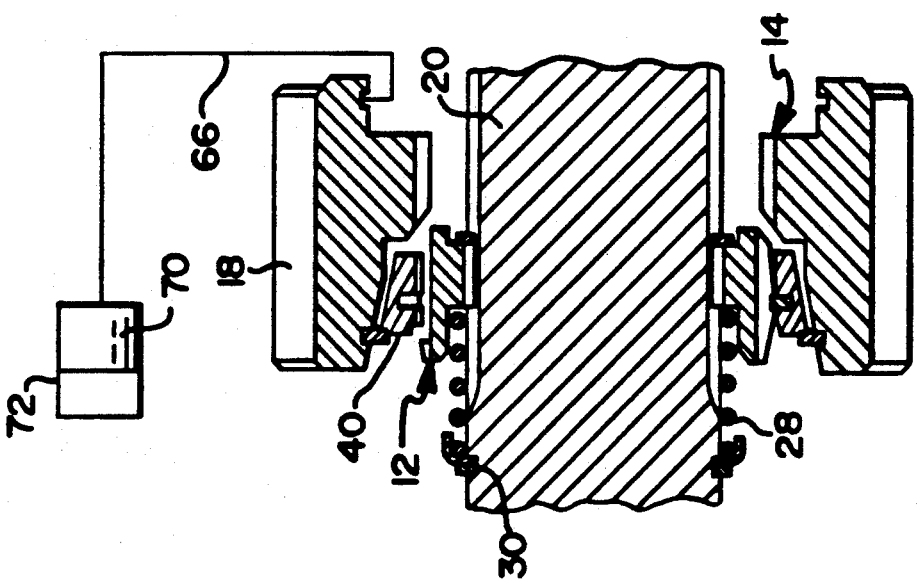

Blocker-clutch assembly 10, as thus far described, is generally known in the prior as may be seen by reference to previously mentioned U.S. Pat. No. 4,703,667. Such assemblies provide for preselection of the ratio gears they are associated with, e.g., the actuating means (shift fork 66 and piston 72) for engaging the positive clutch members 12,14 may be fully displaced prior to synchronism therebetween. Actual engagement of the positive clutch members occurs at a later time, as may be seen by reference to FIGS. 6A-6C. Briefly, FIG. 6A illustrates a neutral or nonselected position of blocker-clutch assembly 10. FIG. 6B illustrates a preselected position wherein gear 18, clutch member 14, shift fork 60, and piston 72 are fully displaced with clutch member 12 moved leftward against the bias force of spring 28 and with frustoconical surfaces 62,64 frictionally engaged to maintain a blocking position until synchronism is crossed due manual or automatic means charging the speed of shaft 20 and/or gear 18. Such means are known and are typically provided by changes in the speed of a prime mover connected to shaft 20 and/or by use of a brake connected to the shaft or gear. When an unblocking condition occurs, as the clutch members cross synchronism, the biasing force of spring 28 moves or fires clutch member 12 into engagement with clutch member 14. Since relatively high synchronism crossing rates often occur, spring 28 must provide sufficient force to quickly move clutch member 12 into engagement. FIG. 6C illustrates the engaged position of the positive clutch members.

Now with respect to the present invention in general, it is known, as disclosed in U.S. Pat. No. 4,703,667, that blocker-clutch assemblies having unblocking ramps, such as ramps 48-54, have a tendency under certain dynamic operating conditions to prematurely unblock or crash and allow nonsynchronous engagement of clutch members 12,14. Hereinafter is disclosed an improved friction material configuration at the interface of the frustoconical surfaces which has, to date, completely solved the premature unblocking or crash problem while at the same time substantially reducing manufacturing cost of the blocker-clutch assemblies.

Figure 7:
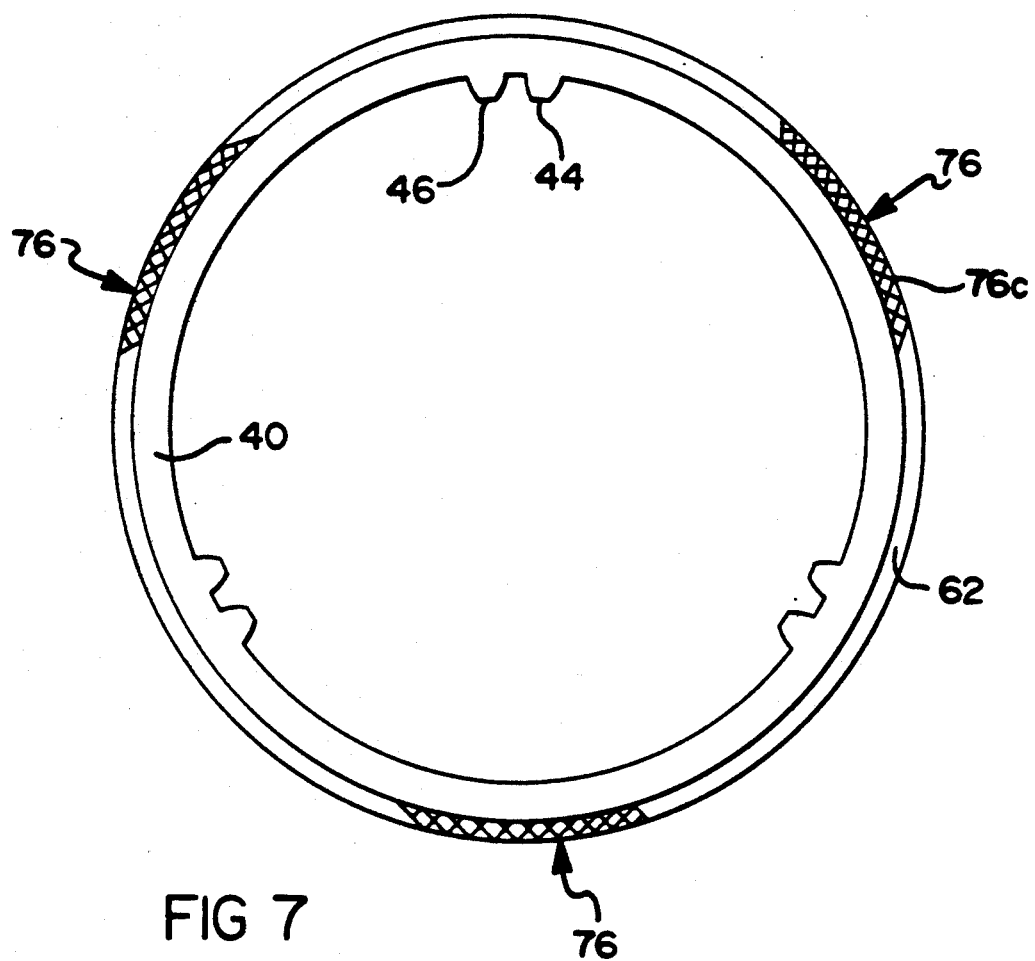
FIGS. 7-8 illustrate the configuration and position a carbon/carbon composite friction material according to the invention.
Figure 8:
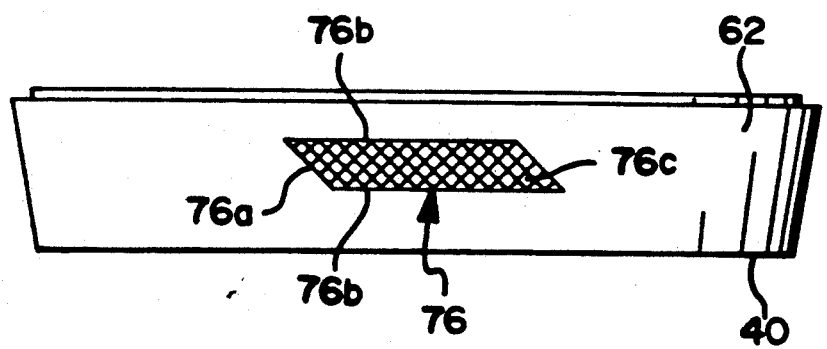
Figure 9:
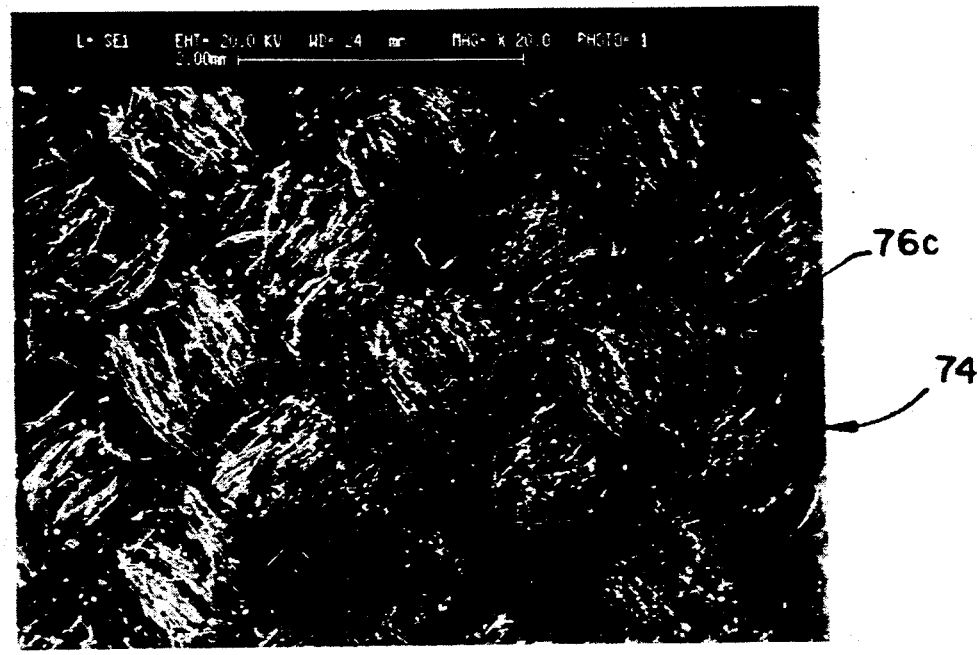
FIGS. 9-10 are enlarged photographic plan views of the friction surface of the material.
Figure 10:
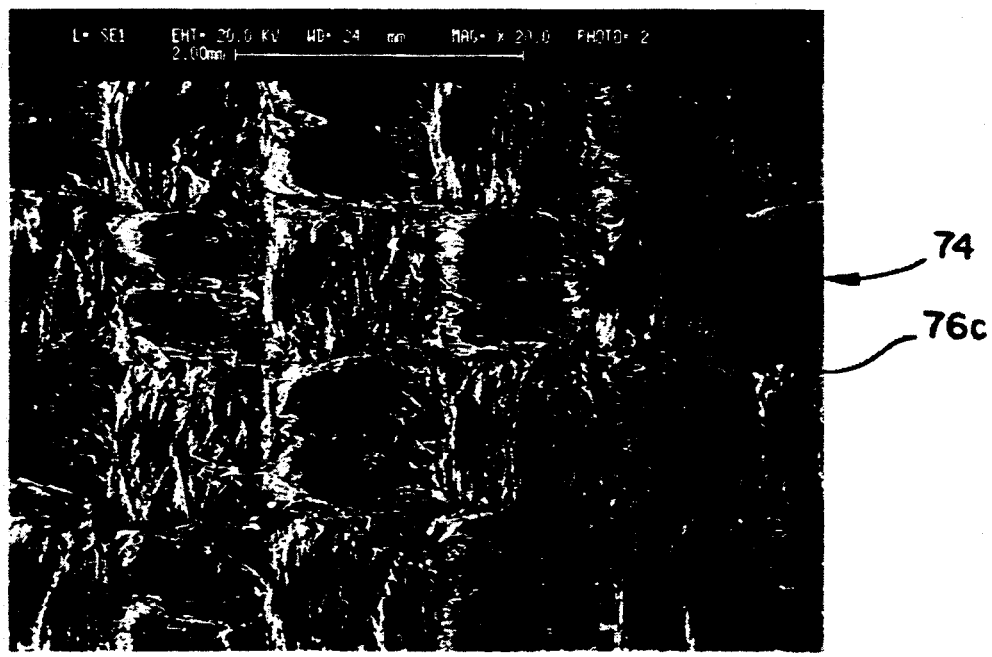

By reference now to FIGS. 7-10, therein is disclosed a carbon/carbon composite friction material 74. FIGS. 9, 10 are enlarged photographic plan views of material 74. FIG. 9 shows the texture and porosity of the friction surface of the material prior to testing and FIG. 10 shows the friction surface after crash free testing equal to over three life cycles of blocker-clutch assembly 10. FIGS. 7, 8 illustrate the configuration and position of the material on blocker ring surface 62.

The material 74 is preferably formed of a single woven layer substrate of carbon fibers coated or infiltrated by chemical vapor deposition (CVD) process with pyrolytic carbon. The fibers may be formed of many known materials, but are preferably formed of carbonized rayon or polyacrylinitrite (PAN). Carbon filaments may be used in lieu of fibers provided the weave of the fabric is sufficiently resilient in directions normal to the plane of the fabric, i.e., direction normal to the friction plane of the material when it is in use. Acceptable CVD processes are taught in U.S. Pat. Nos. 4,291,794 and 3,944,686; the first patent teaches a batch process and the second a continuous process. The composite may have a density range of 0.3 to 1.3 gm/cc after the CVD process and prior to bonding to surface 62. However, material on the low end of this range may have a higher wear rate. Material on the high end of the range is currently more expensive and may tend to be too rigid for optimism performance. Accordingly, a range of 0.7 to 1.1 gm/cc is considered to be some what more optimum.

Excellent performance has been obtained with materials spec'd to have a density of 0.8 to 1.0 gm/cc and, as tested, measured to have a density of about 0.84 gm/cc.

Manufacturing specifications for this material require the fibers to be based on PAN filaments chopped and spun into yarn; the yarn weight to be 2/10 worsted count; the fabric weave to be 2×2 equally tensioned basket square weave at 18 to 22 pairs per inch (2.54 cm); the density to be 0.8 to 1.1 gm/cc by CVD densification at temperatures not to exceed 1,200° C.; and the thickness to be 0.045 inches (0.11 cm). The texture of the densified or finished material is substantially the same to the naked eye as the woven fabric substrate. The finished material is relatively flexible; is relatively resilient in the previously mentioned direction normal to the plane of the fabric with such resiliently be attributed to the use of spun yarns, weave, and density; and is openly porous with many to the pores being through pores.

Minimum waste of material 74 is achieved by cutting the material into polygonal segments 76 which may be circumferentially spaced apart when affixed or bonded to a support member such as surface 62 of blocker ring 40. Alternatively, the segments may abut each other to define a continuous friction ring surface. When the segments are circumferentially spaced apart, as illustrated in FIG. 7, the leading edges 76a of the segments may be disposed oblique to the direction of rotation of friction surface 76b defined by segments 76 to facilitate rapid wiping of excess oil (cooling fluid) off mating surfaces 64, thereby quickly achieving maximum or design coefficient of friction at the interface of friction material surface 76b and surface 64 in response to initial engagement due to the force transmitted by pre-energizer ring 60. The segments are preferably cut into parallelograms and bonded to blocker ring surface 62 with sides 76c of the material generally oriented parallel to planes extending normal to the axis of rotation; however, such orientation is not believed to be critical. Further, three substantially equally spaced segments are preferred.

Excellent bonds of the material to surface 62 have been achieved using nitrile-phenolic adhesives which are well known in the art. Such adhesives readily withstand operating temperature peaks in the range of 400° F. (200° C.) for short periods of time. For applications producing higher temperatures, other bonding materials are suggested, such as disclosed in U.S. patent application Ser. No. 150,355, filed Jan. 29, 1988.

Figure 11:
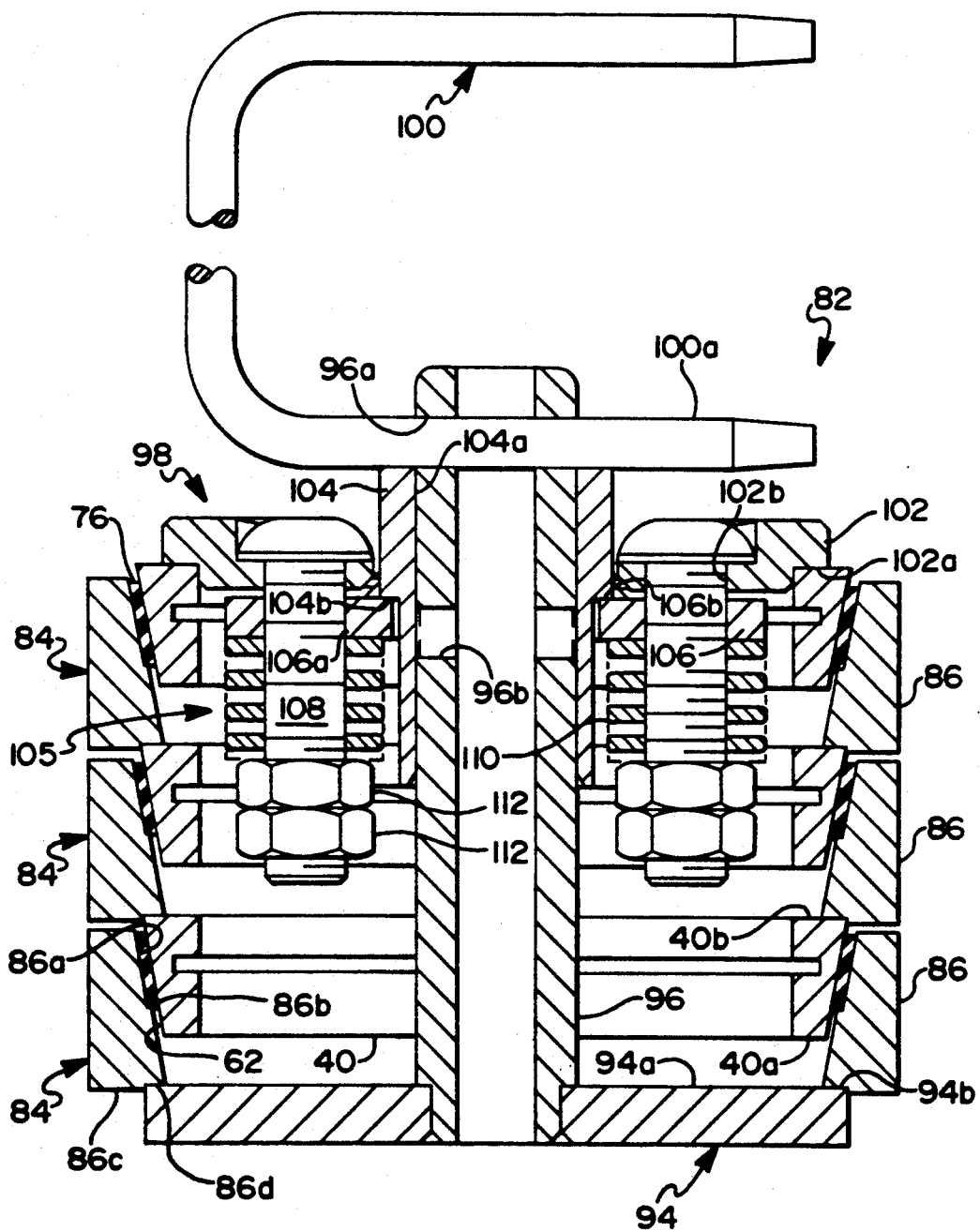
FIG. 11 is a staggered sectional view of a fixture for bonding the carbon/carbon friction material to a blocker ring of the blocker-clutch assembly of FIG. 1.
Figure 12:
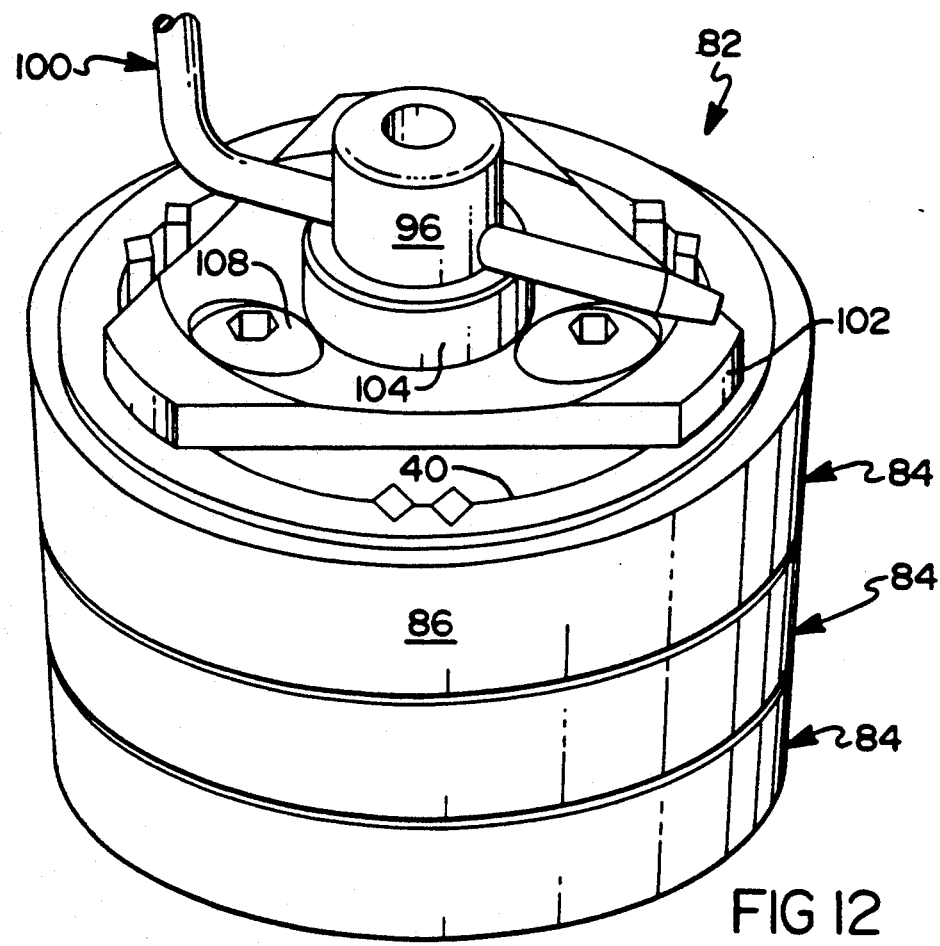
FIG. 12 is a perspective view of the fixture in FIG. 11.
Figure 13:
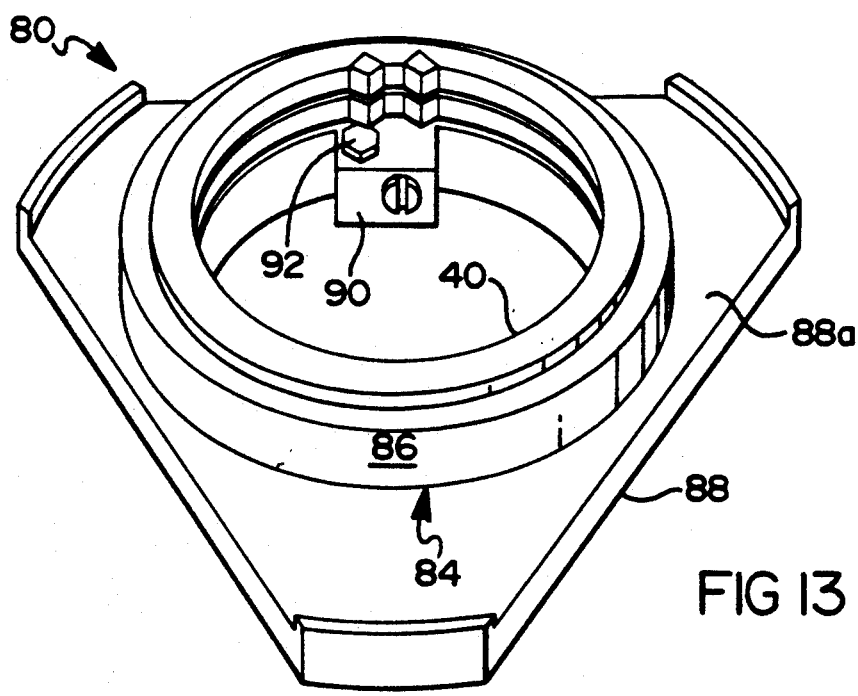
FIG. 13 is a perspective view of an additional fixture device.

Resiliency preserving bonding of the composite material to blocker ring 40 with nitrile phenolic has been obtained with locator fixture 80 in FIG. 13, with bonding fixture 82 in FIGS. 11,12 and by the following method:

1. cutting the material into conveniently handled sizes, 2. heating the material to about 150°–180° F. (65° to 85° C.), 3. rolling the adhesive in sheet form on the material, 4. shearing or cutting the material with adhesive into segments of desired shape and size, 5. placing blocker ring 40 in locator fixture 80, described further hereinafter, to form an annular bonding assembly 84 including the blocker ring, a ring member or bonding cone 86 and plurality of friction material segments 76, 6. placing one or more of assemblies 84 in bonding fixture 82 to apply a relatively evenly distributed pressure of about 200 pounds per square inch (138 N/cm$^2$), 7. heating the fixture and material therein in a convention oven for about 40 minutes while maintaining the force substantially unchanged.

The adhesive used in the above example was B. F. Goodrich Plastilock 601 (nitride phenolic) having an 8 mil. (0.2 mm) thickness. The convection oven is preferably at an initial temperature of 500° F. and should be sized to bring the bond line to 450° F. in 40 minutes at a controlled rate. Further details of the controlled bonding temperature may be obtained from The B. F. Goodrich Company, New York, N.Y.

To prevent loss of the material's resiliency it is important during the bonding process to limit penetration of the adhesive into the open porosity of the material and to limit the pressure applied to the material while heat curing the adhesive. As may be deduced, adhesive penetration is readily controlled by stringent control of the amount of adhesive and/or stringent control of the pressure applied to the material. Excessive bonding pressure tends to extrude even correctly applied amounts of the adhesive deeply into the pores of the material. Further, excessive bonding pressures tend to crush or compact the material with resultant loss of resiliency and porosity. Accordingly, proper bonding pressures are readily determined by bearing in mind that the pressure should be sufficient to firmly hold the material during the bonding process without overly compacting or crushing the material.

Further with respect to porosity and resiliency, the spun yarns and weave of the yarns provide an openly porous substrate or fabric which is relatively resilient in the direction normal to the weave of the fabric. A substantial portion of the substrate open porosity and resiliency is retained by the composite material by limiting CVD coating or densification of the substrate to the range of 0.3 to 1.3 (preferably 0.8 to 1.1). Further, the open porosity and resiliency of the composite material in the area of its friction surface is maintained during the bonding process by using volumes of adhesive that are less than the open porosity volume of the composite, and by limiting the magnitude of the bonding process pressure for minimizing crushing the composite material and for maintaining the open porosity volume of the composite material greater than the volume of the adhesive, whereby the volume of the open pores adjacent to the bond side of the composite material consumes the adhesive while the pores adjacent to the friction side remains free of the adhesive. Bonding pressures less than 250 pounds per square inch (170 N/cm$^2$) are considered adequate for most carbon/carbon composite materials acceptable for use with blocker-clutch assembly 10.

It has been discovered that premature unblocking can be effectively eliminated by controlling unit loading on the friction surface 76c of material 74 within a 150–300 pounds per square inch (100–200 N/cm²). Since such unit loading in an assembly such as blocker-clutch assembly 10 is primarily a function of the biasing force of spring 28 and since the force of spring 28 must be within a rather narrow range, unit loading has been controlled by tailoring or configuring the surface area 76c of material 74. By way of example, crash free operation has been obtained in tests of blocker-clutch assembly 10 using three parallelogram shaped segments 76 having a combined friction surface area of 1.17 square inches (7.55 cm²). In this example, cone surfaces 62,64 have an angle of about 10° and a mean diameter of about 4.35 inches (11 cm), ramps 48–54 have an angle of about 20°, and spring 28 provides a biasing force of about 50 pounds (35N) when compressed in FIG. 6b.

In the blocker-clutch assembly of this example, the combined friction surface areas 76c constitute a 83% reduction in total friction material surface area relative to the blocker-clutch assembly disclosed in U.S. Pat. No. 4,703,667 and the pressure at the interface of the combined surface areas 76c is 210 pounds per square inch (145 N/cm2).

Locator fixture 80, as seen in FIG. 13, includes a triangular base 88 and three circumferentially spaced locator blocks 90 fixed to a horizontal surface 88a of the base. Only one of the locator blocks is visible in the perspective view of FIG. 13. A vertically adjustable stop 92 is threadably received by each locator block. Fixture 80 facilitates the forming of annular bonding assemblies 84. Three of the annular bonding assemblies are shown in cross-section in FIG. 11 and, as previously mentioned, each includes one ring member or bonding cone 86, one blocker or support ring 40, and a plurality of the friction material segments 76. Ring member 86 includes an inwardly facing frustoconical surface 86a complementary to the outwardly facing frustoconical surface 62 of the support ring, a friction material segment locator ledge 86b extending radially inward from surface 86a a distance less than the minimum thickness of the segments, and an annular bottom surface 86c having an annular locator recess 86d. Each assembly 84 is formed by telescoping a ring member 86 over locator blocks 90 with annular surface 86c resting on horizontal surface 88a, and by positioning support ring 40 partially within ring member 86 with the support member bottom surface 40a resting on stops 92 so as to position the frustoconical surfaces of the members in confronting relation with the radially inner extent of the locator ledge 86b spaced from support member surface 62 a distance less than the thickness of the friction material segments so as to facilitate insertion of three circumferentially spaced segments between the confronting surfaces with the adhesive side against surface 62 and with an edge 76b of each segment against ledge 86b to determine the vertical position of the segments on surface 62 between the bottom and top surfaces 40a,40b of the support member when the assembly is lifted off the locator fixture by grasping ring member 86.

Bonding fixture 82 includes a base member 94 having a horizontal surface 94a with annular shoulder 94b, a tubular post 96 fixed to and having an axis extending vertically upward from the base, a spring mechanism 98, and a U-shaped locking pin 100 having an end 100a received by either horizontal bore 96a or 96b through the post. Two or three of assemblies 84 may be stacked on base 94 with the axis of each assembly disposed along the axis of the post by locator recesses 86d. Spring mechanism 98 including a first member or means 102 having a downwardly facing annular horizontally extending surface 102a for engaging the upwardly facing top surface 40b the ring member at the top of the stack, a second member or tubular means 104 having an inner surface 104a telescopically receiving post 96 and an axially facing shoulder 104b, and three circumferentially spaced spring sets 105 interconnecting members 102,104 for applying a clamping force to assemblies 84 in response to downward positioning of member 104. Each spring set 105 includes a bolt 108 extending through an opening 102b in member 102 and through an opening 106a in an annular member 106 having a shoulder 106b engaged by shoulder 104b, a helical compression spring 110 contained between member 106 and nuts 112 threadably movable on the bolt to vary the preload of the spring. The spring preload is set to apply a force of about 200 psi to the surfaces of the friction material segments when locking pin 100 is in place. The tripod arrangement of spring sets 98 and particularly the tripod arrangement of the friction material segments ensures a relatively even distribution of pressure to the surfaces of the friction material segments and the springs ensure a relatively constant pressure as the adhesive penetrates the open pores of the friction material during the curing processing in the unshown oven.

A preferred embodiment of the invention has been disclosed for illustrative purposes. Many variations and modifications of the preferred embodiment is believed to be within the spirit of the invention. The following claims are intended to cover the inventive portions of the preferred embodiment and modifications believed to be within the spirit of the invention.

What is claimed is:

1. A method of positioning and bonding a plurality of openly porous friction material segments in circumferentially spaced apart positions to a support member frustoconical surface and embraced by a ring member complementary frustoconical surface having circumferentially extending ledge means extending radially therefrom a distance less than the thickness of the segments, the segments formed of a carbon fibrous material woven into a single layer of fabric substrate coated with carbon deposited thereon by chemical vapor deposition to a density of 0.3 to 1.3 gm/cc, one side of the segments having an adhesive affixed thereto; the method characterized by the steps of:

positioning the members with an axis of each substantially vertically oriented, with surfaces thereof in spaced relation a distance greater than the thickness of the segments, with the ledge means defining a substantially horizontal surface, and with the distance between the ledge means and the support member surface less than the thickness of the segments;

inserting the segments in circumferentially spaced relation between the surfaces with the adhesive facing the support member surface and with an edge of the segments against the horizontal surface of the ledge means;

moving the members axially relative to each other in a direction decreasing the spaced distance between the surfaces for sandwiching the segments between the surfaces;

applying a resilient clamping force to the members in a direction tending to further decrease the spaced distance;

heating the members to cure the adhesive while maintaining the clamping force; and terminating the heating, removing the clamping force, and separating the members.

2. The method of claim 1, including the step stacking a plurality of the members having the segments sandwiched therein and then applying the clamping force and heating step.

3. The method of claim 1, including the step of affixing amounts of the adhesive to the friction material in proportion to the amount of open porosity and thickness of the material, and in proportion to the clamping force.

* * * * *